United States Patent
Nardi et al.

(10) Patent No.: US 10,853,545 B1
(45) Date of Patent: Dec. 1, 2020

(54) AUTOMATIC GATE-LEVEL FS ANALYSIS AND FMEDA

(71) Applicant: Cadence Design Systems, Inc., San Jose, CA (US)

(72) Inventors: Alessandra Nardi, Berkeley, CA (US); Francesco Lertora, San Colombano Certénoli (IT); Antonino Armato, Bergamo (IT); Deepak Soi, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/556,751

(22) Filed: Aug. 30, 2019

(51) Int. Cl.
*G06F 30/30* (2020.01)
*G06F 30/3323* (2020.01)
*G06F 111/04* (2020.01)
*G06F 111/20* (2020.01)

(52) U.S. Cl.
CPC .......... *G06F 30/3323* (2020.01); *G06F 30/30* (2020.01); *G06F 2111/04* (2020.01); *G06F 2111/20* (2020.01)

(58) Field of Classification Search
CPC ............................. G06F 30/30; G06F 30/3323
USPC ................................ 716/101, 102, 103, 112
See application file for complete search history.

(56) References Cited

U.S. PATENT DOCUMENTS

| | | | |
|---|---|---|---|
| 7,784,019 B1* | 8/2010 | Zach ...................... | G06F 30/39 716/53 |
| 8,984,467 B2* | 3/2015 | Arunachalann ....... | G06F 30/327 716/101 |
| 10,643,011 B1* | 5/2020 | Nardi et al. ............ | G06F 30/30 |
| 2012/0079439 A1* | 3/2012 | Akar et al. ............ | G06F 30/398 716/106 |
| 2015/0261906 A1* | 9/2015 | Ramachandran ..... | G06F 30/398 716/112 |

\* cited by examiner

*Primary Examiner* — Sun J Lin
(74) *Attorney, Agent, or Firm* — Schwegman Lundberg & Woessner, P.A.

(57) ABSTRACT

Devices, methods, non-transitory computer readable media, and other embodiments are described for automatic gate-level functional safety (FS) analysis and associated circuit design operations. One embodiment involves accessing register transfer level (RTL) design data, and accessing a set of FS data associated with an initial circuit design describing one or more failure modes associated with a plurality of circuit elements, an associated FS design criterion for each failure mode of the one or more failure modes, and one or more associations between the plurality of circuit elements and the one or more failure modes. The embodiment then involves generating a gate-level netlist using the RTL design data, mapping the one or more associations between the plurality of circuit elements from the RTL design data and the one or more failure modes to the gate-level netlist, and generating an updated set of FS data using the mapping of the one or more associations to the gate-level netlist.

20 Claims, 12 Drawing Sheets

AUTOMATIC GATE-LEVEL FS ANALYSIS AND FMEDA

TECHNICAL FIELD

Embodiments described herein relate to electronic design automation (EDA), and to systems, methods, devices, and instructions for automatic gate-level functional safety (FS) analysis and failure mode, effect, and diagnostic analysis (FMEDA) during design and creation of circuits and circuit designs.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between individual circuit elements or design blocks are also part of such EDA system operations. Schematic and layout information for such block portions of a design may be exchanged or licensed as intellectual property.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
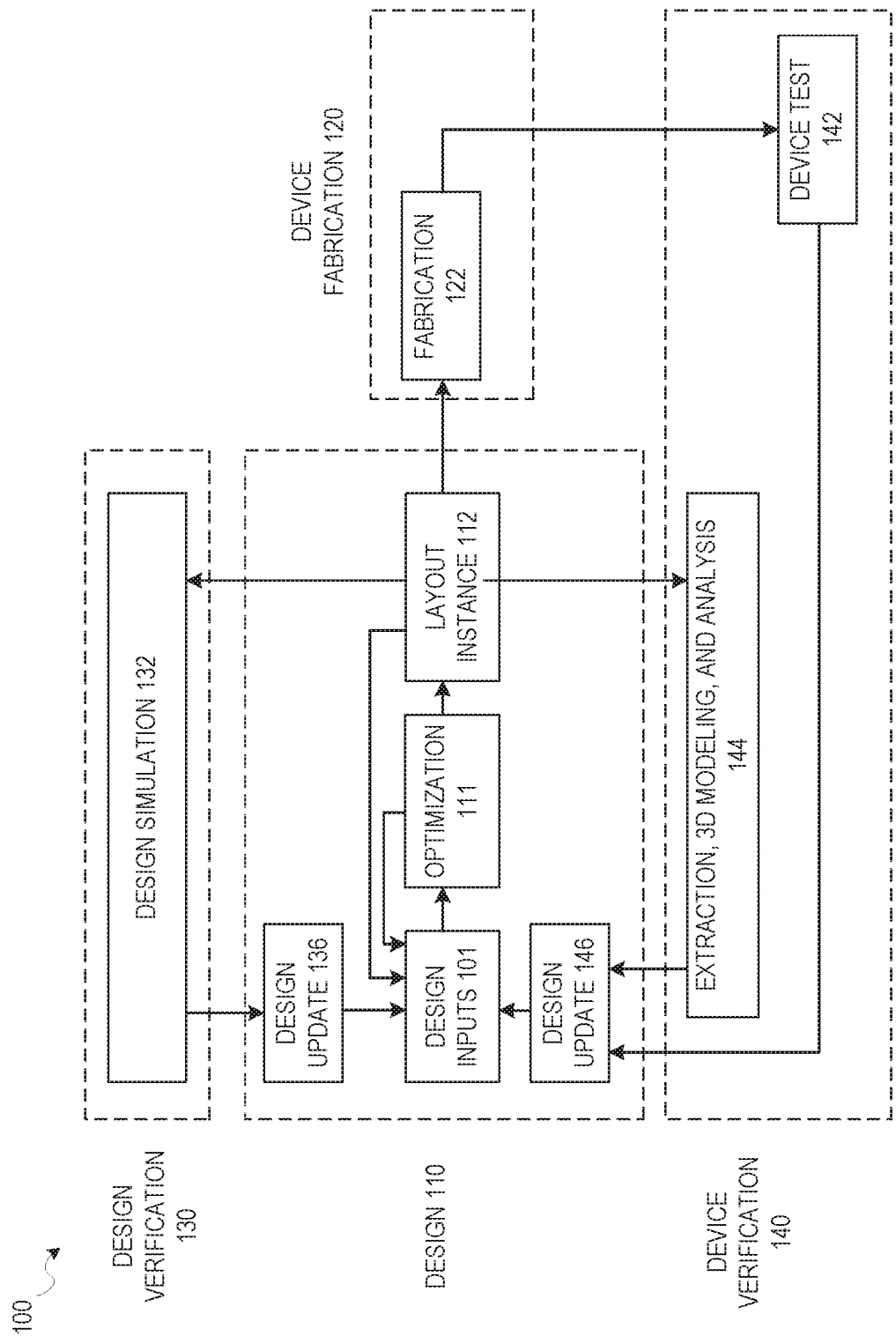
FIG. 1 is a diagram illustrating aspects of one possible design process flow, in accordance with some embodiments.

Embodiments described herein relate to electronic design automation (EDA) and to methods, computer media, and devices used for analyzing, optimizing, and creating electronic circuits with functional safety (FS) criteria. Such systems may automate the mapping process involved in failure mode, effect, and diagnostic analysis (FMEDA) and/or dependent failure analysis (DFA) using standardized input data and automatic analysis and design to meet and verify FS criteria. In particular, some embodiments automate aspects of gate-level FS analysis and FMEDA as part of circuit design operations for creation of a circuit device.

For example, circuitry for an automotive application may have specific failure and redundancy criteria to prevent or mitigate failures expected to increase the possibility of an automobile accident. Similarly, medical device circuitry may have backup requirements with safety critical design criteria. During design of circuit devices for such applications, a circuit proceeds through various design stages, including stages where the design is described using different qualitative and quantitative standards. One particular design transition is from register transfer level (RTL) data describing a circuit to gate-level data describing a circuit. For FS-aware circuit design, each of these design stages will have associated FS data, but in previous systems the safety intent information for each stage is not maintained through synthesis and implementation transitions of circuit design operations. Instead, previous systems involve separate FS analysis at each stage, which is inefficient and work intensive. Embodiments described herein improve the operation of devices performing electronic design automation (EDA) by implementing a mapping between safety hierarchy and design hierarchy of a circuit design that allows the associated safety intent to be maintained through synthesis and implementation of a circuit design. In particular, FS data at the RTL level can be mapped to circuit design components so that the safety intent associated with components in an FS-aware circuit design can be automatically mapped or translated to gate-level circuit design data. This improves the operation of devices by improving the speed of FS-aware circuit design operations performed by devices, and by automating additional elements of FS-aware circuit design with safety and design hierarchy mapping structures in a device that allow the device to perform such operations in ways not previously used in devices for circuit design and EDA.

Embodiments describe methods and mechanisms to capture FS intent and information and map this to design representations (e.g. RTL data and gate-level netlist data). This enables additional automation in design for safety and improves consistency in FS information throughout the synthesis flow of a circuit design, from high-level FS analysis (FMEDA) to signoff. Automation of safety information propagation, especially the safety hierarchy, provides significant benefits. These include reduction in manual FS association with different design levels due to the association of a safety hierarchy to design elements (e.g. design objects, circuit elements, circuit design components, etc.) to reduce an FS-focused designer's iterative and ad-hoc manual work. This also includes standardization of a flow that keeps track of the safety hierarchy defined at RTL through the synthesis process creation of gate-level netlist data, which reduces the errors in the re-association phase on the gate-level netlist, particularly for fine grain computation of the safety metrics. Additionally, by maintaining a safety hierarchy with strict correlation to design elements, a fault list of each failure mode to be used in a fault injection campaign is enabled. In some embodiments, this enables full automation of FS design after FS definitions up to verification steps. In some embodiments, safety metrics are kept consistent throughout the synthesis process and implementation in stages throughout the design flow, and can be automatically verified by the FS rationales provided during the synthesis process. Additional details of various embodiments are described below.

FIG. 1 is a diagram illustrating one possible design process flow which may be enhanced with automatic gate-level FS analysis and FMEDA. As described herein, the standard process flows of FIG. 1 can be enhanced and integrated with the FS data and FS process flows described later to provide an EDA system with automatic design and verification operations for safety critical electronic circuits. In accordance with embodiments herein, such design process flows as shown in FIG. 1 accommodate data inputs of FS data in addition to the described design and analysis inputs, and may also include FS reporting and FS design modifications during design update operations. Additionally, it will be apparent that other design flow operations may function along with any integrated basic circuit operation and FS design considerations described herein as part of a design flow, and design flow 100, is particularly described here for the purposes of illustration. As illustrated, the overall design flow 100 includes a design phase 110, a device fabrication phase 120, a design verification phase 130, and a device verification phase 140. Each of these phases may include FS design and/or FS verification operations as described in more detail below, in addition to basic functional design of a circuit. The design phase 110 involves an initial design input operation 101 where the basic elements and functionality of a device are determined, as well as revisions based on various analyses and optimization of a circuit design. This design input operation 101 is where initial layouts for a circuit are generated before adjustments are made to ensure that functional requirements of the circuit are met. The initial strategy, tactics, and context for the device to be created are also generated in the design input operation 101, depending on the particular design algorithm to be used. Integration of FS with a design flow enables FS data to be input as part of an initial set of design inputs in design input operation 101.

In some embodiments, following an initial selection of design values in the design input operation 101, updates to an initial circuit design may be generated, in accordance with various embodiments described herein, during an optimization operation 111 or a layout instance 112, along with any other automated design processes. As described below, design constraints for a circuit design may be initiated with design inputs in the design input operation 101, and then may be analyzed using a timing analysis, according to various embodiments. While the design flow 100 shows optimization occurring prior to the layout instance 112, updates to a circuit design may be performed at any time to improve expected operation of a circuit design. Use of specialized synthesis operations with mapped FS information enables systems with less manual input and modification of FS detail. Integration of FS data with such a process also allows verification of FS requirements, and automated adjustment of a circuit design to meet FS criteria may occur. For example, if a FS requirement for redundancy is not met, and an automated EDA option is available to automatically insert the redundancy, the circuit may be automatically changed to include the redundancy, with associated verification steps to confirm that the automated adjustment does not violate other functional or FS criteria of the circuit design. In various embodiments, functional and FS constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating and updating a circuit design and verifying the updated circuit design using FS data may therefore involve iterations of the design input operation 101, optimization operation 111, and layout instance 112 generation. In other systems, other design processes may be used.

Figure 2:
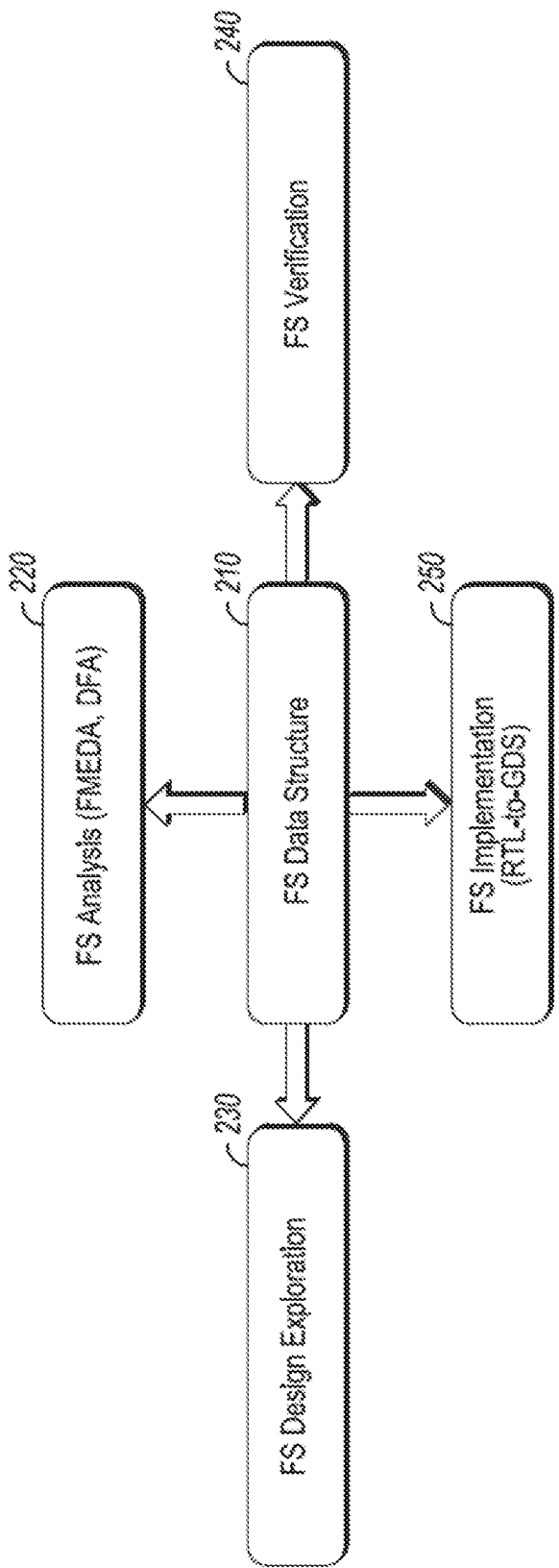
FIG. 2 illustrates aspects of functional safety (FS) data which may be integrated with a design process flow, in accordance with some embodiments described herein.
Figure 3:
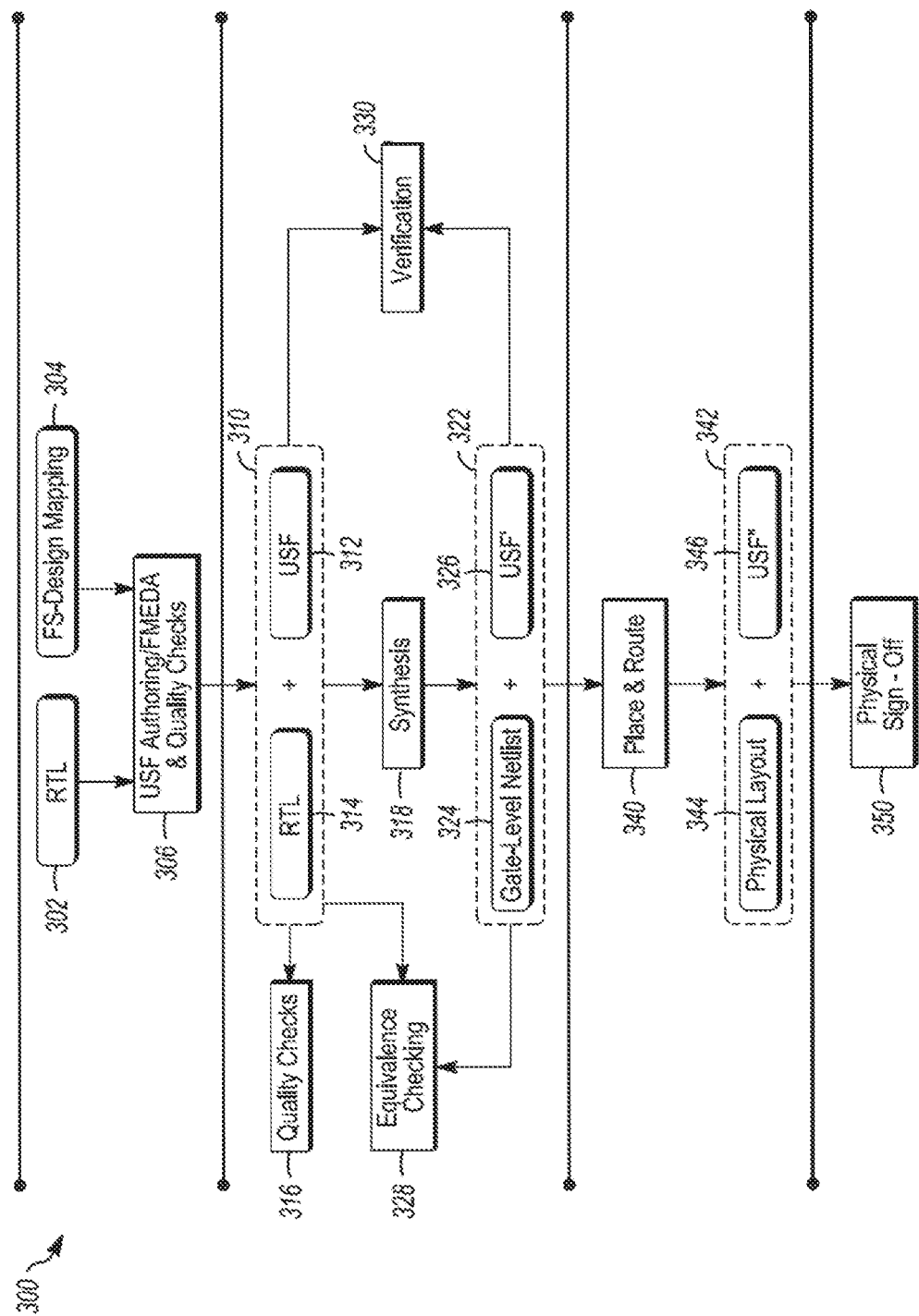
FIG. 3 is a diagram illustrating aspects of one possible design process flow, in accordance with some embodiments.

After design inputs (e.g., functional descriptions of a circuit and FS data) are used in the design input operation 101 to generate a circuit layout, and any optimization operations 111 are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance. Each of these operations may involve design updates based on FS data and FS criteria, as well as FS verification and reporting. FIG. 2 then illustrates FS data and FS operations that can be integrated into the process flow of FIG. 1 or any other such process flow, and FIG. 3 illustrates a particular standardized design process flow with additional details for integration of FS design and verification into the process.

To include functional safety in a design flow, technical safety design parameters (e.g., requirements) for a design are captured and evaluated using FS analysis. The FS analysis is then used to drive design exploration for hardware and software changes, as well as overall implementation and verification. The FS design exploration may start with an RTL of the circuit design, and explore hardware and software safety mechanisms to meet safety metrics, as well as adjusting various additional metrics such as size and verification time. FS implementation (e.g., synthesis) inserts safety mechanisms (e.g., additional circuitry or design changes) targeted to meet or improve FS criteria as well as adjusting the circuit design with layout measures dictated by FS procedures (e.g., FS-aware placement and routing). FS verification validates coverage estimation of safety mechanisms and may use fault injection analysis to model safety and failure modes of a device.

FIG. 2 illustrates aspects of FS data which may be integrated with a design process flow, in accordance with some embodiments described herein. FIG. 2 shows a FS data structure 210 which includes FS data that may be used in various design and analysis processes as part of a design flow. As illustrated by FIG. 2, data from FS data structure 210 may be used by FS analysis operations 220, FS design exploration operations 230, FS verification operations 240, and FS implementation operations 250.

In FS integration with a design flow, technical safety requirements for a product (e.g. circuit, semiconductor device, etc.) are generated as part of the initial design description. In traditional FS processes, these requirements are evaluated using a manual FS analysis. One example is FMEDA, which is a systematic analysis technique to obtain subsystem and product level failure rates, failure modes, and diagnostic capabilities. Some such techniques may consider components of a system, functionality of each component, failure modes of each component, effects of each component failure mode on system operation, the ability of diagnostic components within the system to detect a failure, and various other system design metrics (e.g., operating conditions, safety and failure requirements, etc.) Given accurate input data, such a standardized analysis technique can predict system level failure rates based on component data. Another example of a traditional FS process is DFA, which in some embodiments may be a subset of FMEDA analysis. DFA involves identification of redundancy of functionality that can reduce failures for independent failure modes, as well as identifying independent and dependent failure modes in a system. In various embodiments, such operations may be used to achieve FS goals for a design with automatic integration of design and verification operations in a process flow for a circuit design.

The FS data structure 210 includes data that is provided by a designer as part of the circuit design goals. FS data structure 210 may be considered as including input data along with other circuit design data as part of a design inputs 101 operation. The FS data from FS data structure 210 is then used in various other operations of the design flow such as the illustrated operations 220, 230, 240, and 250. For example, FS analysis operations 220 may use initial FS data to generate additional FS data values and may implement automated FS analysis operations using initial FS data. FS design exploration operations 230 may include operations to analyze hardware and software safety mechanisms to meet associated safety metrics (e.g., FS criteria) in the context of particular circuit elements and circuit design combinations. The results may be used to generate FS reporting and to implement improvements in other operations. FS implementation operations 250 may include design flow operations to adjust a design by including additional hardware safety mechanisms (e.g. failure reduction or failure detection elements within a design). FS verification 240 may include operations to validate coverage estimation of both hardware and software safety mechanisms, and may include fault injection operations based on FS analysis operations 220 to analyze various faults and failure detection mechanisms for a design. In some embodiments, this may include DFA synthesis and automatic layout countermeasures implemented as safety mechanisms (SM) within a design. This may include automatic adjustment and analysis of a circuit translated from a register transfer level description to graphic database system (GDS, GDSII) data used to control integrated circuit photomask plotting for integrated circuit fabrication during design flow. In various embodiments, different levels of detail and types of data may be used as inputs to the FS data structure 210 to be used by these FS operations. Additional examples of FS data structures 210 are described below in FIGS. 4 and 5.

These data structures may be used to verify and improve a design. Functional safety within a process flow uses reliability and failure rate information, information about available safety mechanisms (e.g., software safety, hardware safety, built-in self-test (BIST), etc.) to prevent and detect faults, and information about diagnostic coverage in a design that indicates how well mechanisms detect faults. This FS information may be used to improve a design by identifying better components and better or supplemental safety mechanisms that may be included in design updates. This also may be used to generate standardized functional safety analysis and reporting (e.g., SPFM, LFM, FIT, etc.) to provide FS context for the overall design and any design improvements made during the design process flow.

FIG. 3 is a diagram illustrating aspects of one possible design process flow, in accordance with some embodiments. FIG. 3 particularly describes a design-for-safety process flow 300. This process flow 300 introduces FS data for attribute definition and mapping within the design to be considered throughout the design process. It enables initial identification of safety intent as an input to EDA design operations, with automatic EDA consideration of failure modes (FM) and safety mechanisms (SM). In some embodiments, safety reporting aligned with safety standards (e.g., automotive, medical, etc.) may be included to match application requirements of a particular circuit design. In some embodiments, standard or required SM, DFA countermeasures, or fault injection testing for diagnostic coverage set by FA design criteria or standardized device criteria for an application may be integrated with the EDA process flow.

Process flow 300 begins with an initial circuit design 302 (e.g., RTL circuit device data) and FS design mapping information 304 used to generate a set of FS data 306. FS design mapping information 304 may be received as user inputs from a designer and captured and integrated with initial circuit design 302 information to be structured for use by the EDA process flow as FS data 306. The FS data may be captured during initial input operations through a combination of user defined inputs and calculated data derived from the user (e.g., circuit designer) inputs. Some embodiments may operate without operations to aggregate FS data and may simply accept a single file format with FS data 306 as an input to be used in the process flow. In other embodiments, this FS data may be structured as multiple files or in any other such format to make FS inputs from a designer and any other source available for use by EDA operations of the process flow. This set of FS data 306 may be structured as a Unified Safety Format (USF) file, FMEDA analysis data, quality check data, or any combination of various FS data. FS data 306 may be used for initial FS reporting to generate a standardized FS report of FS inputs to the EDA process flow, which are used to improve FS of an initial circuit design 302. FS data 306 does not include the initial circuit design 302 data, but includes FS information that depends both on the FS criteria of the application as well as the particular failure information associated with the design of initial circuit design 302. These operations may be considered FS data authoring by a designer to create FS data in a format usable by EDA systems as part of a process flow, with FS (e.g., FMEDA) reporting on the initial FS information input into the process flow. The FS analysis associated with the RTL level can include safety hierarchy definitions, which are described in detail below with respect to FIGS. 5-7.

The FS data 306 is then used along with the initial circuit design data 302 as a combination of initial design data 310 which includes circuit design data 314 and FS data 312 as part of a set of EDA front-end operations. The initial design data 310 (e.g., circuit design data 314 and FS data 312) are used in quality check operations 316, verification operations 330, equivalence checking operations 328, and synthesis operations 318 as part of the front-end process flow within the overall process flow. While shown linearly within FIG. 3, any of these operations may be iterative, or may involve initial analysis, modification of the design, and checking with removal or additional changes based on checks within the process flow.

Embodiments described herein then included an automatic mechanism for having the synthesis operations 318 maintain the safety hierarchy defined in the FS analysis at the RTL level as the synthesis operations 318 create gate-level netlists 324 and updated FS data 326 as part of updated design data 322.

Synthesis operations 318 in particular may include insertion of design elements within the overall circuit design to meet FS criteria or improve FS performance. As described herein, synthesis operations can involve automatic mapping between design phases, with modifications managed as part of the synthesis operations. Additional details of such mapping and modification are described below with respect to FIGS. 5-9. Further, in some embodiments, performance is improved with FS design modifications. For example, automatic insertion of circuit redundancy (e.g., triple modular redundancy (TMR), dual-core lock step (DCLS), dual modular redundancy (DMR)) to reduce failures, automatic insertion of test points or monitoring circuitry (e.g., built-in-self-test (BIST)), automatic error detection circuitry (e.g. parity protected register circuitry, error correction code (ECC) circuitry, input/output (I/O) loopback circuitry, etc.), or other such standardized FS mechanisms and FS structures devoted to alarm transportation and fake error injection may be automatically inserted based on the FS design mapping 304 identified in the initial steps of the process flow and/or and included in FS data 306. FS reporting is available to identify which of these mechanisms are available as part of the EDA process flow, and later reporting may identify which mechanisms were actually used and how.

After synthesis operations 318 to include any insertion of FS mechanisms within a design, the initial design data 310 and the updated design data 322 (e.g. including updated gate-level netlists 324 and updated FS data 326 reflecting FS information associated with the inserted FS mechanism(s)) are used for various operations such as equivalence checking 328 and verification 330 to confirm that the elements were added to the design correctly without generating problems with the circuit design. In some embodiments, initial design data 310 may use RTL data for circuit design data 314. In various embodiments, synthesis operations 318 may result in RTL data as part of updated design data 322, or updated design data may be a gate-level netlist or any other such circuit design data. In some embodiments, quality check operations 316 or any combination of verification and checking operations may confirm circuit design consistency with FS criteria. This may also involve tagging or mapping of FS based modifications to the initial circuit design, and tracking changes at different stages of the design to implement updated FS modifications using the mapping. Additional checks may identify expected changes to FS criteria such as expected changes in failure rates or failure reporting and effects based on FS based modifications to the design.

Once the updated design data 322 is generated with expected operations for additional iterations or updates, the updated design data 322 is used for place and route operations 340. In some embodiments, FS-aware placement and routing with rules to reduce common cause failures and cascading failures are used, with associated FS reporting based on routing and placement failure risks (e.g., DFA reporting). This results in output circuit design data 342, which includes physical layout circuit design data 344 (e.g., GDSII data) combined with output FS data 346. This output circuit design data 342 may then be used for physical sign-off operations 350, with associated output FS reporting. This may include any analysis and checks of the final output design against input FS criteria, such as expected specific failure criteria which limits expected failure rates or sets reporting and response criteria for failures. In some embodiments, physical sign-off operations 350 output data files which may be used by fabrication hardware to generate a physical semiconductor circuit from the output circuit design data 342.

A process flow 300 may, for example, be targeted to particular FS criteria for an automotive application. In such an environment, particular FS criteria are related to providing reliability and functional safety so that if something breaks, recovery may be made to a safe situation. Such criteria may include FS quality metrics, robustness metrics, and reliability metrics. FS quality may include metrics to meet design specifications at start of life and produce zero defective parts per million during initial operation. FS design robustness may include designs configured to tolerate random failures with signal integrity, power integrity, and other such failure tolerant systems. FS reliability metrics may include designs to meet specifications until end-of-life, measured in failures per billion hours of operations. Failures analyzed may include latchup, electrostatic discharge, temperature, aging, electromigration, and other such failures. Functional safety integration into process flows involves circuit designs optimized to manage all of the above as well as a design to transition to a safety state when any random or permanent failure occurs. Circuit objects (e.g., including individual objects and blocks or groups of objects) in a circuit design may have associated FS data to describe both operation of the individual objects and criteria applied to the objects and overall system operation. Combinations of FS information for objects and the design as a whole may be used during a FS process flow to measure functional safety and generate FS reporting. This may include multiple different levels of analysis, such as FMEDA reporting with a systematic approach to analyze what can go wrong and whether the design is able to detect failures. This may include calculations of random hardware safety metrics from FS data for objects as integrated in a particular design, with updates as the design changes. This may include timing analysis with evaluations on whether failures can be detected in time to revert to a safe state. This may also include DFA reporting to evaluate common cause failure effects that can reduce the effectiveness of safety measures. Automated processes in the design flow, in accordance with embodiments described herein, may combine circuit designs with information about objects and FS criteria (e.g., structured as FS data) for automated design and verification operations.

Figure 4:
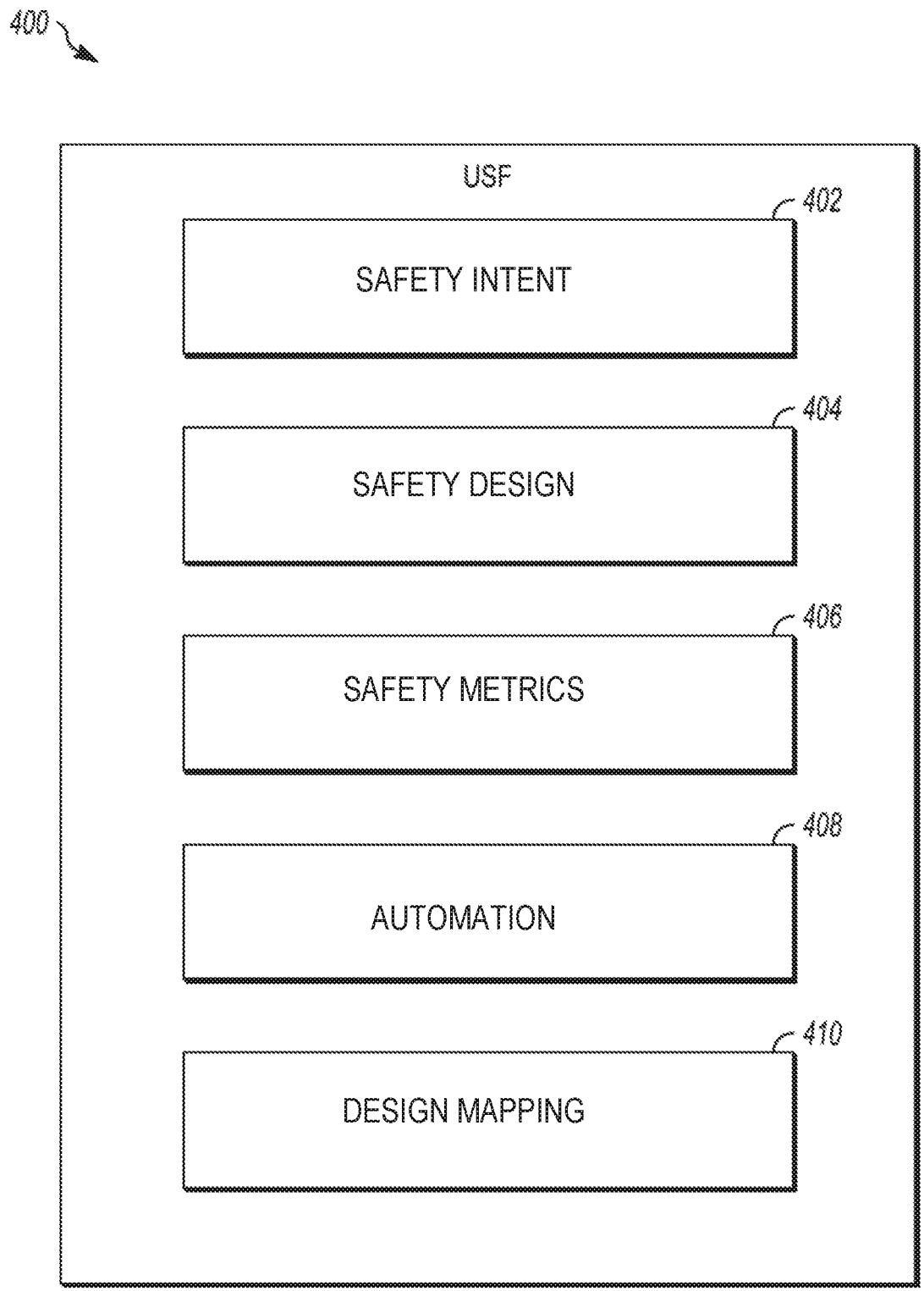
FIG. 4 illustrates aspects of FS analysis and associated data which may be used with an EDA design process for FS, in accordance with some embodiments.
Figure 5:
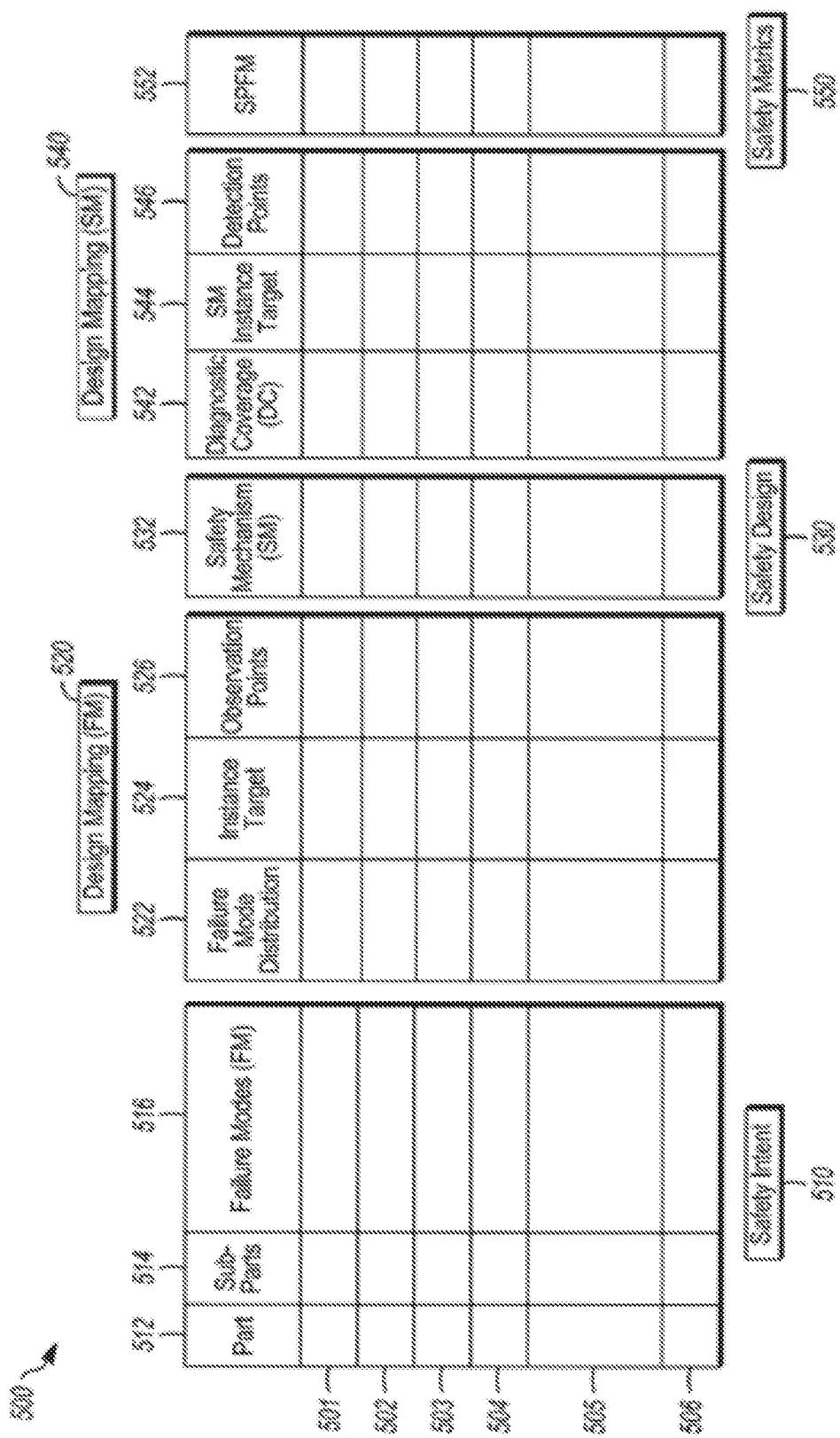
FIG. 5 illustrates aspects of FS data which may be used with an EDA design process for FS, in accordance with some embodiments.

As may be seen above from the description of process flow 300, automatic design and verification of safety critical electronic systems as described herein relies on designer (e.g., user) inputs to set FS criteria, which is propagated automatically through the process flow. In complex devices, such FS criteria may include significant complexity. FIGS. 4 and 5 describe standardized formats for ordering the complex FS criteria which are used within a FS-aware process flow.

FIG. 4 thus illustrates aspects of functional safety data which may be used with an EDA design process for FS, in accordance with some embodiments. FIG. 4 illustrates an example Unified Safety Format (USF) 400. In the example USF 400, safety intent data 402, safety design data 404, safety metric data 406, information for automation data 408, and design mapping data 410 are included. In some embodiments, this data can be organized as supporting information for a FMEDA virtual hierarchy within the USF file. In other embodiments, such a hierarchy can be structured in different ways, designated by a designer separate from the USF file, or structured in different ways for use by and EDA system. The illustrated FS data structure of USF 400 is different from standard FMEDA reporting formats, and allows introduction and maintenance of FS data within a process of low design hierarchy to enable automation of design and reporting. As described further below, the FMEDA virtual hierarchy can be mapped to design elements to enable associations which allow automatic gate-level FS analysis and FMEDA during synthesis operations. Circuit designs that can function with such automatic operations can include any number of circuit elements and blocks of elements. Each element and different combinations of elements (e.g., blocks) may have different associated FS goals and other such data, and can be assigned associations with elements of the virtual hierarchy. From a database view, such FS elements and blocks may have safety goals, failure modes, reliability data, and associated compatible safety mechanisms. From an operational view, the configuration of the elements and blocks into a circuit design may use the database view information for FS analysis, FS design updates, FS verification, FS sign-off, FS reporting, and any other operations to confirm that FS criteria associated with the design are met. The USF 400 elements allow the database information for circuit elements to be combined with information about FS operations in a way that can be used by the process flow to implement automatic FS design updates and reporting. For example, safety intent data 402 may reflect the safety and reliability criteria set by a designer for a circuit design. Safety design data 404 and safety metric data 406 may reflect the FS performance of the circuit elements of a design as arranged in a particular circuit design. Safety intent data 402, safety design data 404, and safety metric data 406 reflect FMEDA report data, which may be combined with information for automation data 408 to enable automated EDA based improvements to a circuit design. For example, associating blocks of data with particular allowed automated improvements; identifying automation to adjust problematic routing and placement from a FS perspective that may otherwise meet device performance criteria; or other such data may be identified as part of information for automation data 408. Design mapping data 410 then tracks user and system updates to a circuit design to map FS operations. For example, addition of SM circuitry to a circuit design may be tracked as a way of mapping a circuit design change to a particular FS criterion when the SM circuitry improves associated FS performance or helps the circuit design meet a performance threshold. Such information may then be used for FS reporting as described above in various operations of a FS enabled process flow.

In various embodiments, the exact information included in FS data that is gathered and used by EDA operations may vary. In some embodiments, objects are sorted by various part descriptions and may have associated information such as the ability of a part to impact safety goals (e.g., FS criteria) of the overall design. Additional information may include failure rates, safety mechanisms that may be used to modify the object, and FS performance associated with the object. This information may thus describe how objects can impact FS goals, how likely objects are to fail, options for detecting or preventing failures, and various related safety metrics, such as single point fault metrics (SPFM), latent fault metrics (LFM), and/or probabilistic metrics for hardware failure (PMHF).

FIG. 5 illustrates aspects of functional safety data which may be used with an EDA design process for FS in accordance with some embodiments. FIG. 5 illustrates a detailed example of FS data in an example USF file format 500. USF file format 500 includes data for a plurality of circuit objects 501-506. Each circuit object 501-506 may be an individual element of a circuit or a block or group of circuit objects. In the example of FIG. 5, each circuit object 501-506 has associated safety intent data 510, failure mode design mapping data 520, safety design data 530, safety mechanism design mapping 540, and safety metric data 550. Such data may be stored in fields of a table, with each field comprising data for an object (e.g. a circuit object, block, or element). In other embodiments, other data may be included in FS data, or other combinations of this data and other data may be used. As illustrated, safety intent data 510 includes part data 512 and any associated sub-part data (e.g. data on objects, elements, or sub-blocks of a block or portion of a circuit design), as well as a listing of any possible failure modes 516 associated with the part 512 and any sub-parts 514. Safety intent data 510 may include information that identifies the safety intent for different portions of a circuit design. Different portions of the design having similar attributes may be collected together into groupings (e.g., blocks of circuit elements). In some embodiments, grouping different portions of a design with different safety features, rules, or FS criteria may occur within a single set of FS data. In other embodiments, different portions of a circuit design (e.g., critical and non-critical portions of a system on a chip (SoC)) may have different FS data. Not every part 512 will have an associated sub-part 514. Similarly, if associated failure modes are negligible, some parts may not have an associated failure mode. In other embodiments, only parts (e.g., objects or object groups) with significant failure modes are included in the FS data of USF file format 500. Failure mode design mapping data 520 includes failure mode distribution data 522, instance target data 524, and observation point data 526. Safety designation data 530 includes safety mechanism data 532. Safety mechanism design mapping data 540 includes diagnostic coverage data 542, SM instance target 544, and detection points 546. Safety metric data 550 includes failure rate data 552. In each of these instances, certain circuit objects 501-506 may have multiple pieces of data associated with the particular part, or may not have any data associated. For example, part 505 may have no associated sub-parts and no associated safety mechanism, while circuit object 501 may have multiple safety mechanisms, and part 502 may have multiple sub-parts.

Table 1 below illustrates examples of additional details that may be included in various embodiments of FS data.

TABLE 1

| DS Group | DS field |
| --- | --- |
| Safety Goals | Tag |
|  | SPFM Permanent |
|  | SPFM Transient |
|  | LFM |
| Failure Modes | Part |
|  | Subpart |
|  | Failure Mode Definition |
|  | Failure Mode Distribution Permanent |
|  | Failure Mode Distribution Transient |
|  | SPFM Permanent |
|  | SPFM Transient |
|  | LFM |
|  | Observation Points |
|  | Percentage Safe Permanent |
|  | Percentage Sate Transient |
|  | Type |
|  | Classification |
| Safety Mechanisms | Safety Mechanism Definition |
|  | Type |

TABLE 1-continued

| DS Group | DS field |
| --- | --- |
| Reliability | DC Permanent (SPFM Permanent)<br>DC Transient (SPFM Transient)<br>DC Latent (LEM)<br>DTI<br>Detection Points Permanent<br>Detection Points Transient<br>Detection Points Latent<br>Classification<br>Tag<br>Type<br>Area<br>λe trans<br>λe perm<br>λe bit/FF |

In some embodiments as described above, the FS information and FS data used by a process flow are integrated into a single file format for use with circuit design data. In other embodiments, not all of the information for different safety categories need be in a single file format. For example, in some embodiments, only safety design intent technology information is used as the FS data, and this information may be used with circuit design data in a process flow without other FS data described herein. In some embodiments, rather than using FS data in table formats or other file formats as described above, the FS data is structured as HDL extension data which may be used in conjunction with HDL and RTL data, which describes the circuit being designed with FS-aware EDA processes. HDL extension data can be structured as a language extension to be used with the HDL. In this approach, language constructs pertaining to safety information, which may be used for automatic design and verification, are added to extend the functionality of a conventional HDL such as VERILOG or VHDL. This HDL extension data can contain not just safety intent information, but also any FS data or safety information in accordance with any embodiment described herein. In some embodiments, the safety information is maintained as one or more files formatted in HDL file format, along with other files for the circuit design such as RTL. This safety information can include safety intent information, hierarchy structures, or any other such safety information in accordance with embodiments described herein.

This information is then used in a progression through the circuit design. A qualitative analysis is performed to identify ways in which the circuit can fail. The design is partitioned into a safety hierarchy of parts, sub-parts and failure modes (FMs) based on the functional description (e.g. a block diagram representation). In some embodiments, several FS parameters, such as for example the distribution of the FMs, are not evaluated at the qualitative analysis stage. When the design netlist become available, either during RTL operations, gate-level operations or schematic level operations, quantitative FMEDA can be performed to predict the Failure Mode Distribution (FMD). The FMD provides a relative weight of FMs and their probability of failure (e.g. FIT). In accordance with embodiments described herein, FMs can be mapped or "connected" to the design components that generate such failures to estimate these values may be based on area occupation and technology type. This resolves aspects of problems with conventional approach, which include: traditionally the connection between the safety hierarchy and the design hierarchy is not formalized or formally captured, hence the estimation work is mostly manual and cumbersome, and usually based on a variety of heuristics; and safety intent is not maintained through steps of synthesis and implementation tool (e.g. place and route), where safety analysis methods are done separately at each stage, hence making it highly inefficient and manual work intensive. The mapping described above extends and defines the use of FS data (e.g. a USF as described herein) to drive the synthesis flow in order to keep track of the safety hierarchy association with the design elements, and enable automatic gate-level FS analysis and FMEDA.

Figure 6:
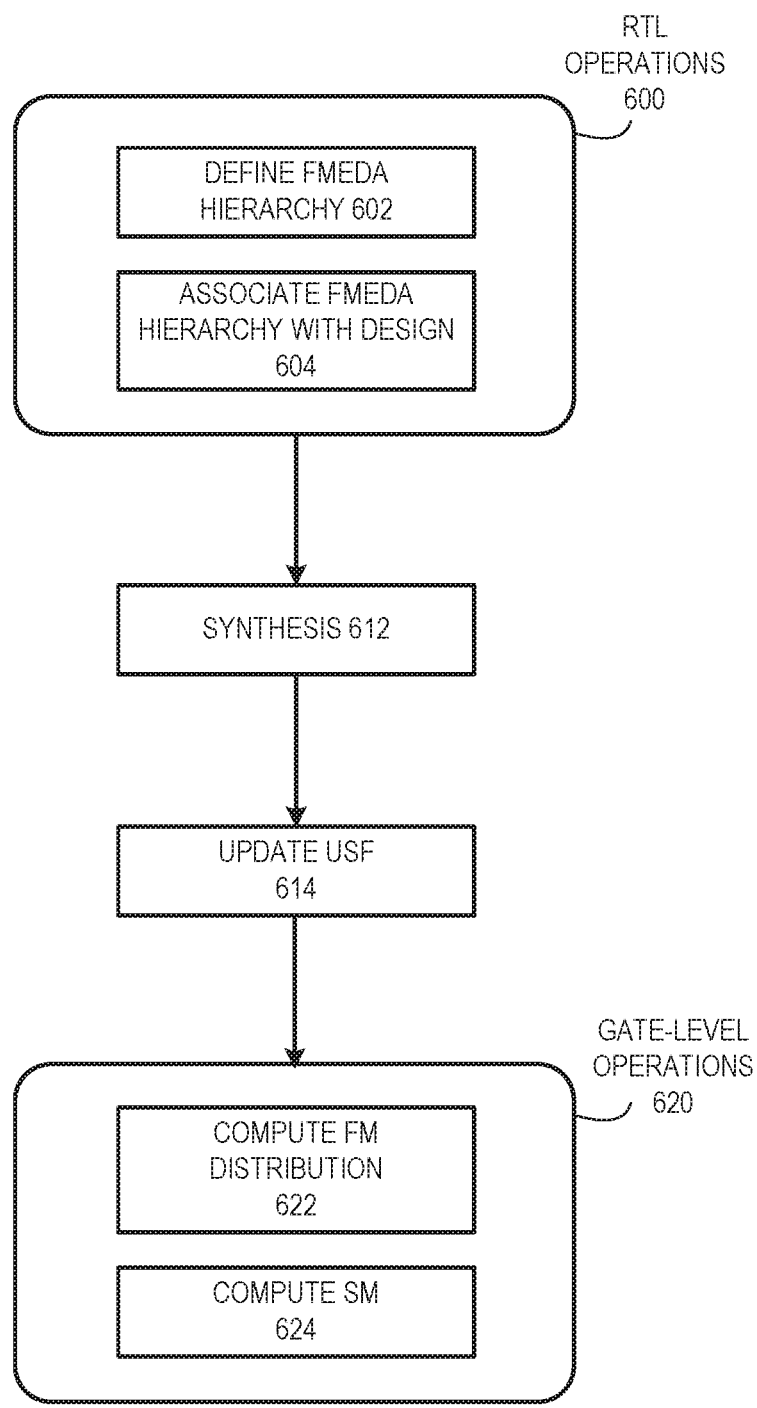
FIG. 6 illustrates aspects gate-level FS design and analysis in accordance with various embodiments.

FIG. 6 then illustrates aspects gate-level FS design and analysis in accordance with various embodiments. The embodiment of FIG. 6 uses a USF file that includes FS data, and separate RTL data for design elements of a circuit design. FIG. 6 begins with operations at the RTL level, illustrated as RTL operations 600, though in other embodiments, additional elements or operations can occur before this. With RTL operations 600, an FMEDA hierarchy is defined in operation 602, and the FMEDA hierarchy is associated with design elements in operation 604. In various embodiments, this can function where a flow starts with the register-transfer level (RTL) description of the design, together with a separate USF description of the related safety intent (e.g. the corresponding design mapping). The RTL and USF descriptions are stored in separate files so that they can be maintained and modified separately. The operations include defining an FMEDA. Synthesis then proceeds in operation 612. As part of synthesis operations 612, a synthesis tool reads the RTL and the USF safety intent descriptions, and based on their contents, synthesizes a gate-level netlist. In various embodiments, the synthesis tool is 'failure mode aware' and keeps track of the logic modifications during the applied algorithms (e.g. Logic pruning, Retiming, Ungrouping, etc.). Additional details of such operations and modifications are described below, particularly with respect to FIG. 8. In this way the synthesis tool is able to generate an updated USF file in update USF operation 614 having the original USF information modified to keep track of the design mapping of the parts and subparts, as well as other FS information from FS data and FS analysis, after the synthesis process in operation 612. For example, automatic gate-level FS operations 620 analysis can include computation of FM distributions 622 and computation of SM distributions 624 automatically with the information from the updated USF file that is created using the tracking of logic modifications from the mapping.

In accordance with the above description, embodiments can be implemented using USF to define an FMEDA virtual hierarchical association, not constraining any synthesis step or decision, but preserving designer-defined associations from initial FS set-up of the circuit design. After a synthesis elaboration phase, a synthesis tool can load the USF to design and create these virtual associations between the FMEDA hierarchy and the design elements present post elaboration step. During the next synthesis steps, the synthesis tool can keep track of such associations updating the corresponding FMEDA objects as the design elements changes during the course of synthesis.

Figure 7:
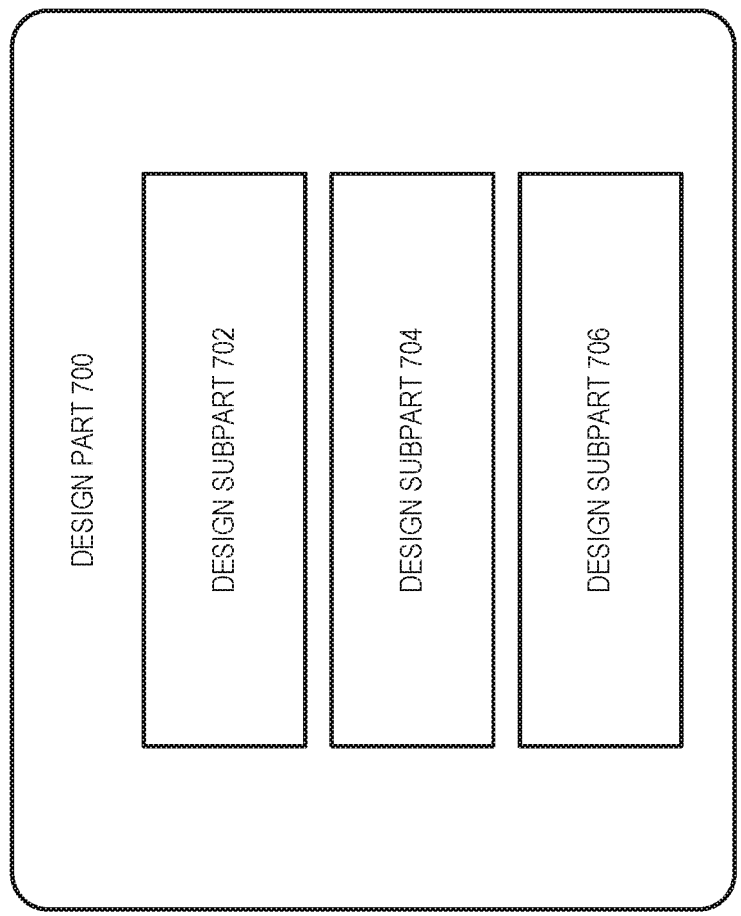
FIG. 7 illustrates aspects of circuit design data for automatic gate-level FS design and analysis in accordance with some embodiments described herein.

FIG. 7 illustrates aspects of circuit design data for automatic gate-level FS design and analysis in accordance with some embodiments described herein. As described above, design elements of a circuit design can be organized into hierarchical levels as part of FS focused circuit design. FIG. 7 illustrates a generic design part 700 with design subparts 702, 704, and 706. During hierarchy definition, a design component is divided into hierarchical levels, such as design part 700 and design subparts 702, 704, 706. These are portions of the hardware that can be logically divided. For example, international standards organization (ISO) ISO 26262-1 defines the hardware part as "portion of a hardware component at the first level of hierarchical decomposition"; and ISO 26262-1 defines the hardware subpart as "portion of a hardware part that can be logically divided and represents second or greater level of hierarchical decomposition". FIG. 7 illustrates a simple circuit design with a single part having three subparts, but actual designs can have any number of parts and each part can have any number of subparts.

For a circuit design, illustrated in FIG. 7 with various parts and subparts, the FS analysis and FMEDA can follow a FS design flow, which is now described. For each subpart of a design element, at least one FM data element is defined. FMs describe the way in which an operation potentially fails to deliver the intended function. ISO 26262 provides a list of FMs that can be used for characterizing a semiconductor. ISO 26262-1 defines a failure mode as "manner in which an element or an item fails to provide the intended behavior". In the FS data or USF file, information for the safety hierarchy is linked to the design hierarchy so that FMs are associated to the corresponding part of the design that can trigger them. The total area of the design can also be evaluated to calculate the total failures in time (FIT), which describes a number of failures that can be expected per given device-hours of operation (e.g. failures per billion device-hours of operation), based on the base failure rate for the technologies deployed. Identifying this information enables the result of the computation that gives a 'raw FIT'. The safety failure or potential danger of a design without any countermeasure is described by the raw FIT. At this level of design, a quality of the technologies base failure rates and the evaluation of the silicon area are fundamental. For example, at the RTL level the number of gates or expected silicon area can be estimated to get a preliminary evaluation of the raw FIT. This is an estimation that is refined during the device implementation, as the fundamental information is refined based on the actual implementation details such as a final silicon area, number of gates, memory cuts, analog macro, or other such design details.

FM distribution can then be evaluated during the design process. FM distribution expresses the relative weight of a FM with respect to the other FMs of the same part or subpart of a design. (e.g. the sum of the FMDs for a lowest level subpart is 100%). Heuristics are used for this estimation and they can differ significantly between digital and other designs. Ranking of the FMD and their FIT can be used as criteria to drive the selection of the SMs. In various embodiments, a Failure Mode Distribution (FMD), and the raw failure rates can be used as starting points, to compute the safety metrics defined by the ISO 26262 standard as a Single Point Fault Metric (SPFm). In some embodiments, to correctly evaluate the FMD of the input/output (I/O), a correct evaluation of its gate count and of all internal instances (e.g. memories, analog macros etc.) are used. Whenever the FMEDA is started from RTL, the association between the FMs and the design hierarchy can be simple and defined by the intrinsic hierarchy of the RTL. During the synthesis/place and route stages, however, a design hierarchy is not naturally preserved. Embodiments described herein operate to preserve the hierarchy automatically with unique and flattening operations. In previous systems, post-layout netlists are difficult to use when setting up the final detailed FMEDA since the post-layout netlists have relevant circuit portions fully flattened and so without straightforward ways to re-construct the FMs associations defined at the RTL-level, or at different design implementation stages. Prior systems can operate in two ways. First, with preserve ('don't touch') techniques for pre-defined failure modes or hierarchical blocks. Such operations are difficult to be generalized. Hierarchy preservation can lead to relevant implementation end-effects for what concerns power-performance-area (PPA). Furthermore it is not feasible in many systems with a complex design to preserve all hierarchies and all failure mode associations. Manual scripting or filtering using netlist preserved naming across the implementation flow can be used to try to keep track of the logical modifications but this is complex, tedious, error-prone and inaccurate, in particular whenever the failure modes granularity to be reconstructed is fine. As previously stated, the quality of the FMD computation is vital to compute the metrics defined by the ISO standard, so this technique is risky and very often lead to serious mistakes in the evaluation of the gates addressed by failure modes. Embodiments described herein avoid the issues with these techniques using mapping of the FS hierarchy to design elements that can be carried through synthesis to automatically enable gate-level FS analysis and FMEDA without the problems described above. The 'relative' (e.g. expressed as percentages) safety metrics such as SPFm are used to finally classify the device under analysis. An example of this is an Automotive Safety Integrity Level (ASIL).

In a design, after safety metrics are identified, safety mechanisms (SMs) are inserted to cover the FMs. ISO 26262-1 defines the Safety Mechanism as "technical solution implemented by functions or elements, or by other technologies, to detect and mitigate or tolerate faults or control or avoid failures in order to maintain intended functionality or achieve or maintain a safe state". A Safety Mechanism is designed to prevent a given percentage of faults to violate the 'Safety Goal'. In one example, the ECC in the Physical Register File would be able to prevent 90% of the faults to violate the safety goal, while 60% for what concerns the parity in the I/O interface logic and related failure mode. With this information, a 'residual failure rate' can be computed for each given failure mode, to identify a failure rate (e.g. expressed in FIT) that the safety mechanisms is not able to prevent. In other embodiments, other specific fault prevention metrics, targets, or design improvements can be used.

While the initial FS design operations described above are largely selections (e.g. manual design inputs) based on the expertise of a designer (e.g. Safety Engineer), subsequent steps can be more easily integrated in an EDA flow with different degrees of automation. Evaluation of the total area of the design, estimation of a designs total FIT, and the area of each FM with associated FS data can all be automated.

For digital circuits, an estimation of the area for a circuit design and for each FM can be done semi-automatically aided with scripting. The amount of manual work that may be required depends on how accurate an estimate is being targeted, and what other degrees of freedom sacrificed to have structures and partitions that can be easily identified and measured in a design. These area estimation operation are also inherently complicated by the overlap that can exist in the netlist between different FMs. Such overlaps involve proper partitioning to correctly account for their contribution to the overall probability of failure. An example of simple heuristic used to estimate the contribution of FMs is to associate one or more output pin to each FM and then estimate the percentage based on the total number of output pins. Embodiments described herein can use such associations as part of automatic gate-level FS analysis.

In various embodiments described herein, the partitioning process starts at RTL level with the definition of the safety hierarchy of the design. This safety hierarchy information can then be propagated through the synthesis process, to maintain correspondence between the design hierarchy and its partitioning to allow automatic gate-level FS analysis, thus reducing manually design time to re-apply the partitioning at gate level netlist and avoiding errors associated with computation of the failure mode distribution and impacts on the correct computation of the overall safety metrics.

Figure 8:
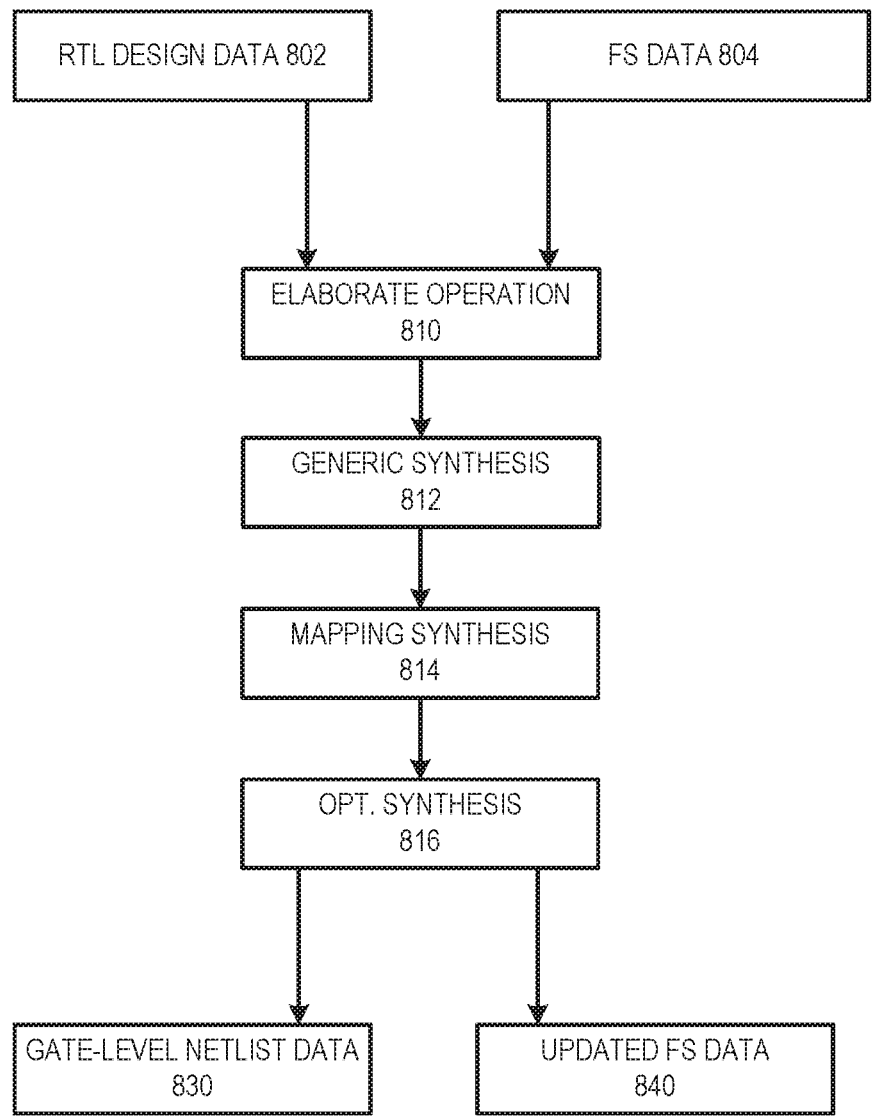
FIG. 8 illustrates aspects gate-level FS design and analysis in accordance with various embodiments.

FIG. 8 illustrates aspects gate-level FS design and analysis in accordance with various embodiments. As described above, embodiments can begin with RTL design data and FS data. This data can be stored in separate files to maintain independence between the initial data, shown in FIG. 8 as RTL design data 802 and FS data 804. RTL design data 802, for example, can be an RTL design file, and FS data 804 can be an USF file. FIG. 8 then illustrates an example of data used from these sources in a multi-step synthesis process, with a mapping between RTL design data 802 and FS data 804 used to propagate FDMA and FS analysis information through the synthesis to gate-level analysis after the synthesis operations.

A synthesis tool (e.g. a generic synthesis tool) operates with an initial elaborate operation 810 that reads the RTL design data 802 and the FS data 804 (e.g. USF file safety intent descriptions). At this stage the design is taken and translated into the synthesis tool memory and the safety intent is verified for basic consistency.

Generic synthesis operation 812, mapping synthesis operation 814, and optimization synthesis operation 816 are shown in order, but these operations can operate repeatedly in a variety of ways during actual FS-aware synthesis operations. Individual subparts can be identified and subject to generic synthesis operations 812 to synthesize RTL design elements into gate-level netlists for a circuit design. In addition to these basic operations, the associations between the design elements and the FS hierarchy identified by a designer can be used during synthesis for mapping synthesis operations 814, which may translate FS information through the synthesis process, so that the updated FS data 840 is automatically correct for the gate-level netlist data 830 generated by the synthesis. As described above, this is done with tracking the modifications through the synthesis process from RTL data to gate-level data. Optimization synthesis operations 816 can involve any operations to improve device performance or influence the synthesis steps to achieve design results.

As described above, embodiments similar to the embodiment of FIG. 8 can include variations or alternate details of particular aspects. In some embodiments, the generic synthesis operation 812 can involve implementing technology independent optimizations, mapping synthesis operation 814 can involve translating the design into technology-specific cells, and optimization synthesis operation 816 can involve working on technology-specific design elements and toward satisfying user defined constrains as timing. In other embodiments, any of these operations can involve a datapath architecture modifications, logic restructuring modifications, a technology cell mapping, a logic pruning modification, a retiming modification, and an ungrouping modification. One example embodiment includes each of the above elements. Other embodiments can include any combination of such elements.

Combinations of these synthesis operations, along with some placement and routing operations, can include logic pruning, arithmetical optimization, constant propagation, logic speculation, resource and common sub-expression sharing, redundancy removal, multiplexer optimization, retiming, scan insertion, clock network synthesis, ungrouping, UPF (Unified Power Format or IEEE Std 1801™ operations), or other such modifications. Some embodiments particularly include datapath architecture modifications, logic restructuring modifications, technology cell mapping, logic pruning modifications, retiming modifications, and/or and ungrouping modifications. Further, some embodiments can use technology-specific mapping optimizations that can be accessed independently or provided by a designer. Various embodiments can include one or more, or all such modifications, or any combination of such modifications. For these modifications that can occur during the synthesis operations (e.g. combinations of generic synthesis operation 812, mapping synthesis operation 814, optimization synthesis operation 816, and other such operations), a gate-level netlist data 830 update and an updated FS data 840 results. As described above, this information can then be used in FMEDA and FS analysis, as well as in circuit design updates and modifications.

If the synthesis process is seen as iterating and optimizing a network where nodes represents the design instances, then 'failure mode aware' operation can be conceived as a coloring of the nodes according a FM tag or identifier. During user-defined or tool-defined synthesis phases or steps there could be corner cases generating issues to the 're-coloring' process. In all these cases the synthesis tool preserves what has been defined by the designer during FS definitions. This is because the failure mode association, from the end-user point of view, have functional meaning that is lost once the design has passed through generic synthesis, and design has already been optimized for best PPA by operations of the synthesis tool. For example, if the end-user (e.g. designer) defines a failure mode addressing a 'bus decoder', the synthesis tool will analyze the functionality provided by the source hardware description language and its output will be a group of gates/standard cells which can give best timing, power and area (PPA). Similarly post synthesis, any given implementation flow is meant to guarantee the correct final integration on silicon unaware that the involved gates are implementing a 'bus decoder' functionality indeed. However, this information is vital for the functional safety engineers analyzing the design through the implementation processes. Hence maintaining this information through steps of synthesis is vital for functional safety engineers. Embodiments can thus include options to select emphasis of FS-aware synthesis operations. In one embodiment, PPA first FS first, and balance selections are available to a designer (e.g. system user). In PPA first operation modes, a synthesis tool can operate where it will emphasize a best PPA at the tradeoff of possible loss of some of the functional safety hierarchical information (e.g. merging across user hierarchical boundaries, dead logic removal, etc.). In a safety first operating mode, the system will emphasize full functional safety hierarchical information to be preserved over PPA optimization. In a hybrid mode, a synthesis too can make cost or other structured decisions or emphases to evaluate and select which hierarchical information can be sacrificed with defined or threshold trade-offs to PPA performance. Other embodiments can include finer grained or targeted details for such trade-offs based on user provided inputs and system settings for FS-aware design and synthesis using a synthesis tool with these features.

In some embodiments, options within a synthesis tool can allocate to preserve the functional safety hierarchical information can be configured with specific modes, and can vary the emphasis for different parts or aspects of a circuit design, so that certain portions of a circuit design can include one emphasis (e.g. PPA first) while other portions can have a different emphasis (e.g. FS first). In case of conflicts (e.g. from logic sharing, logic removal due optimizations etc.), a 'coloring' decision can be structured with a synthesis tool. Such decisions can be logged with associated rationale(s) provided to the end user by means of logging information. The synthesis tool can implement different 'coloring' techniques (e.g. overlapping, not overlapping). For FS verification purposes, some embodiments include a provided method that is able to inform a designer of a summary of the 'colors' (FMs) for a circuit design. In some embodiments, this takes into account overlaps, and involves gathering the total and correct number of design instances (e.g. as additive property of the failure modes). In such embodiments, correctly evaluating the Failure Mode Distributions (FMD) against the real number of standard-cells/instances on a mapped and synthesized design, provides an improvement to the operation of a FS-enabled EDA device with a solution to one of the most complex topics faced by functional safety engineers.

Some embodiments can operate with merging of 'colors' (e.g. and associated failure modes dependencies) due to logic optimizations. Such operations are in control of the end user. If the user allows failure mode logic merging, in such embodiments the synthesis tool will recolor one instance with more the one failure mode 'color' or tag.

Figure 9:
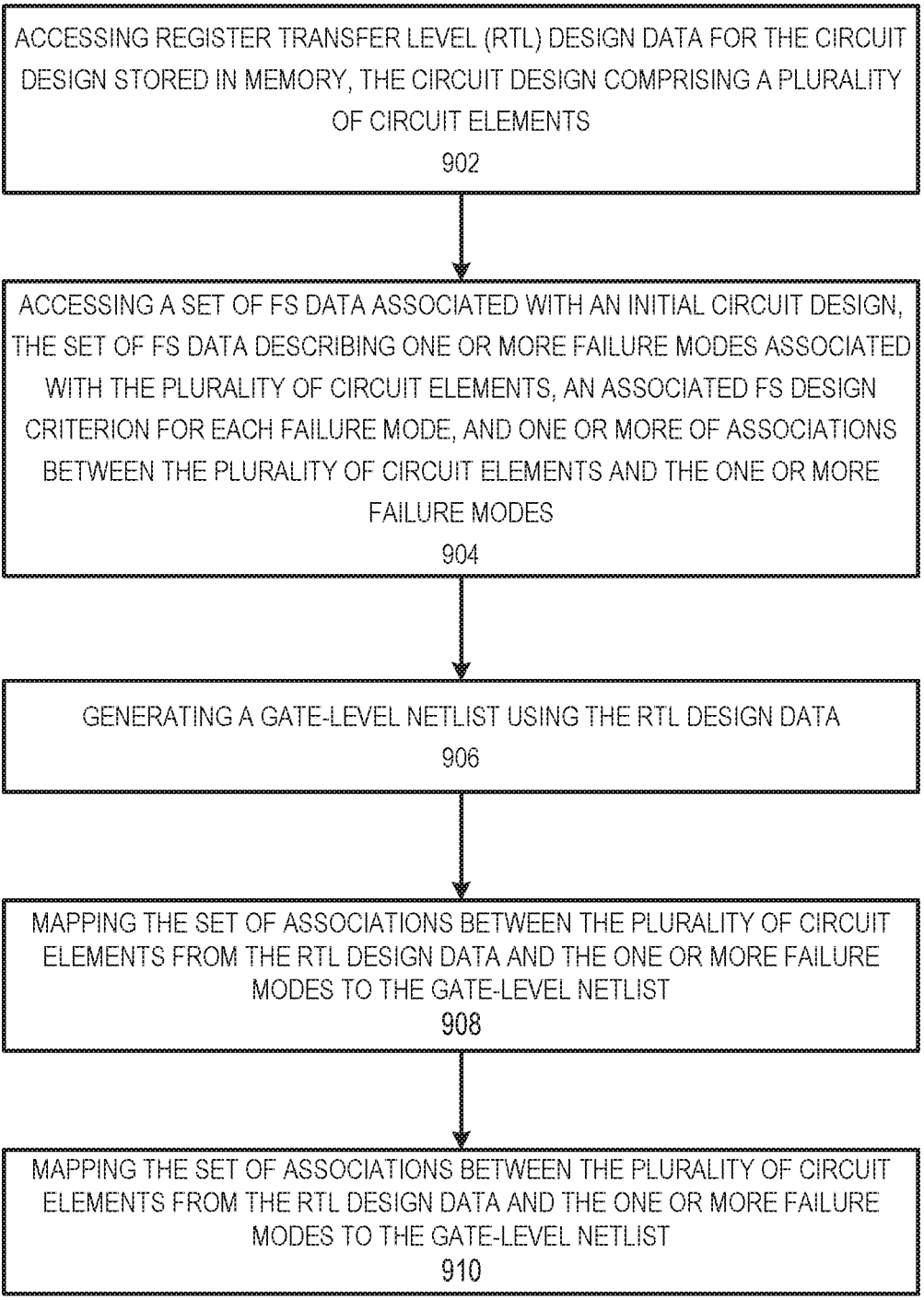
FIG. 9 illustrates a method for automatic gate-level FS analysis and FMEDA during design and creation of circuits and circuit designs in accordance with some embodiments.

In some embodiments, instance removal is supported during the 're-coloring' phase. The corner cases (e.g. a failure mode initially defined by the end user, ends up without instances) can be explicitly logged by the synthesis tool in such embodiments. Some such embodiments operate with instance modification/substitution (e.g. scan flip-flops) supported during the 're-coloring' phase. For some embodiments, instances synthesis (e.g. clock/reset tree) is supported during the 're-coloring'. In such embodiments, the added and synthesized instances are associated to the related failure mode logic. Further, in various embodiments, a selective association between failure mode and safety mechanism will allow preservation of specific safety mechanism functionalities FIG. 9 illustrates a method 900 for automatic design and verification of safety critical electronic systems, in accordance with some embodiments. The method 900 particularly describes one method for an automatic gate-level FS analysis and FMEDA in accordance with embodiments described herein. In some embodiments, the method 900 is performed by a computing device with one or more processors. In some embodiments, the method 900 is embodied in computer-readable instructions stored in a non-transitory storage device, such that when the instructions are executed by one or more processors of a device, the device performs the method 900. Other embodiments may be implemented using any acceptable format or instantiation.

The method 900 begins with operations 902 involving accessing register transfer level (RTL) design data for the circuit design stored in memory, the circuit design comprising a plurality of circuit elements. The circuit elements can be structured in an organized hierarchy with parts and subparts, or such structure can be implemented on design data.

Additionally, a set of FS data associated with an initial circuit design is accessed in operation 904. As described in various embodiments above, the set of FS data (e.g. a USF file) describes one or more failure modes associated with the plurality of circuit objects, an associated FS design criterion for each failure mode, and one or more of associations between the plurality of circuit elements and the one or more failure modes. Such initial FS intent information is provided by a designer before the automation of subsequent synthesis operations.

Using the information from operations 902 and 904, processing circuitry of a device then proceeds with generating a gate-level netlist using the RTL design data in operation 906, and with mapping the set of associations (e.g. one or more associations) between the plurality of circuit elements from the RTL design data and the one or more failure modes to the gate-level netlist in operation 908. As also detailed above, various other synthesis operations can occur, including optimization and elaboration steps. In various systems and synthesis tool embodiments, such operations can be merged together, or can be kept separate and repeated in various combinations for the specific aspects of a circuit design being generated.

The details of the synthesis operations are then used in a generated output in operation 910, where an updated set of FS data is generated using the mapping of the set of associations to the gate-level netlist. This set of FS data at the gate-level can then be used with various different FS analysis operations for updating a circuit design, for FS aware placement and routing, for FS reporting at the gate-level, or for any other such elements of FS based circuit design.

In some embodiments, as detailed above, the set of FS data comprises a single Unified Safety Format (USF) file separate from the RTL design data, which is updated to create an updated USF file. Some such embodiments operate where the USF file comprises safety intent data comprising one or more part or sub-part fields and one or more failure mode fields, failure mode design mapping data comprising failure mode distribution fields, instance target fields, and observation point fields, and safety design data comprising safety mechanism fields each identifying one or more safety mechanisms. Such information can be provided by a designer as part of FS definitions in an FS focused circuit design process. Similarly, this information can include hierarchy information which is then used during the mapping the set of associations (e.g. one or more associations) to defining a failure mode, effects, and diagnostic analysis (FMEDA) virtual hierarchy within the USF file. In some such embodiments, mapping the set of associations comprises associating elements of the FMEDA virtual hierarchy with design elements of the gate-level netlist, and then generating the updated set of FS data comprises tracking changes to the design elements of the gate-level netlist and generating the updated USF file using mapping data from the mapping of the set of associations to determine FS changes associated with the changes to the design elements.

Outputs of the operations and updated FS data can then be used, in some embodiments, for automatically analyzing the gate-level netlisting using the updated USF file. In some embodiments, operations can further involve generating an updated circuit design based on a FS design failure identified from the updated USF file. Some embodiments then additionally involve generating a circuit using an updated circuit design. Circuit designs can be improved iteratively by automatically adjusting the RTL design data to implement a FS design adjustment when a FS quality check associated with the set of updated FS data fails to meet associated FS design criteria and storing a circuit design file comprising FS-aware placement and routing data. In some embodiments, the FS design adjustment comprises identifying a safety mechanism associated with safety metric data of the FS data for the circuit design that does not meet the safety threshold and automatically updating the circuit design using the safety mechanism to improve the safety metric data. In some embodiments, automatically updating the circuit design using the safety mechanism to improve the safety metric data comprises addition of modular redundancy circuitry for a circuit object of the circuit design and/or addition of parity check circuitry for one or more registers of the circuit design.

Figure 10:
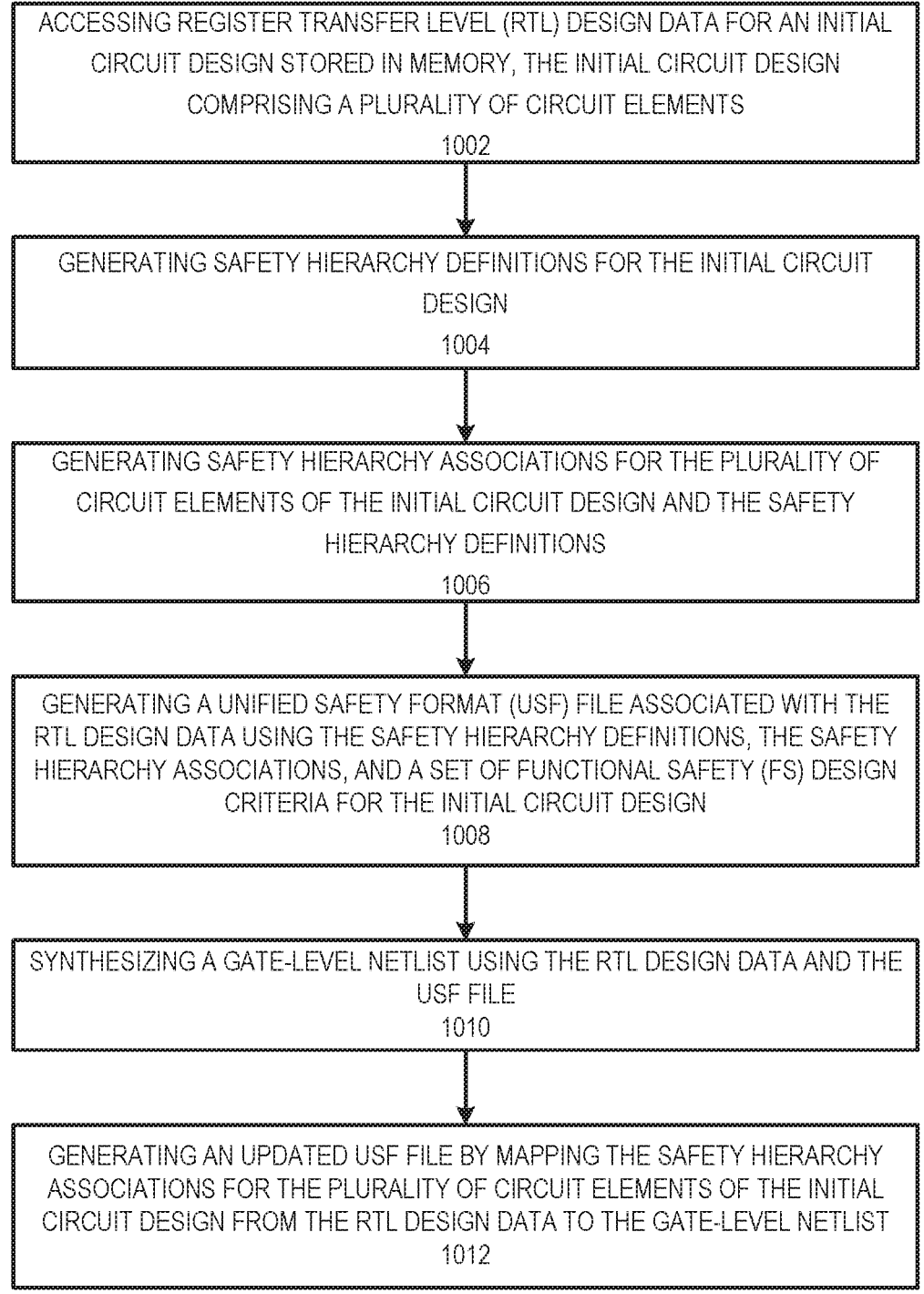
FIG. 10 illustrates a method for automatic gate-level FS analysis and FMEDA during design and creation of circuits and circuit designs, in accordance with some embodiments.

FIG. 10 illustrates a method 1000 for automatic design and verification of safety critical electronic systems, in accordance with some embodiments. The method 1000 particularly describes one method for an automatic gate-level FS analysis and FMEDA in accordance with embodiments described herein. In some embodiments, the method 1000 is performed by a computing device with one or more processors. In some embodiments, the method 1000 is embodied in computer-readable instructions stored in a non-transitory storage device, such that when the instructions are executed by one or more processors of a device, the device performs the method 1000. Other embodiments may be implemented using any acceptable format or instantiation.

Method 1000 includes operation 1002 involving accessing register transfer level (RTL) design data for an initial circuit design stored in memory, the initial circuit design comprising a plurality of circuit elements. Safety hierarchy definitions are generated in operation 1004 for the initial circuit design. Such definitions can be provided by a designer, or accessed from any suitable source. The safety hierarchy definitions and RTL design data are then used in operation 1006 for generating safety hierarchy associations for the plurality of circuit elements of the initial circuit design and the safety hierarchy definitions. These associations are structured to allow FS information to be maintained through synthesis operations as described above.

In operation 1008, method 1000 proceeds with generating or updating a Unified Safety Format (USF) file associated with the RTL design data using the safety hierarchy definitions, the safety hierarchy associations, and a set of functional safety (FS) design criteria for the initial circuit design. Synthesis operations then follow, which can include various optimization, mapping, and elaboration elements. Regardless of the specific implementation of the synthesis operations, in operation 1010 a gate-level netlist is synthesized using the RTL design data and the USF file, and in operation 1012 an updated USF file is generated using the mapping of the safety hierarchy associations for the plurality of circuit elements of the initial circuit design from the RTL design data to the gate-level netlist.

While particular embodiments are described above, including ordered steps and placement of elements in various orders, it will be apparent that other embodiments may include repeated operations, or any number of intervening operations between the operations described.

Figure 11:
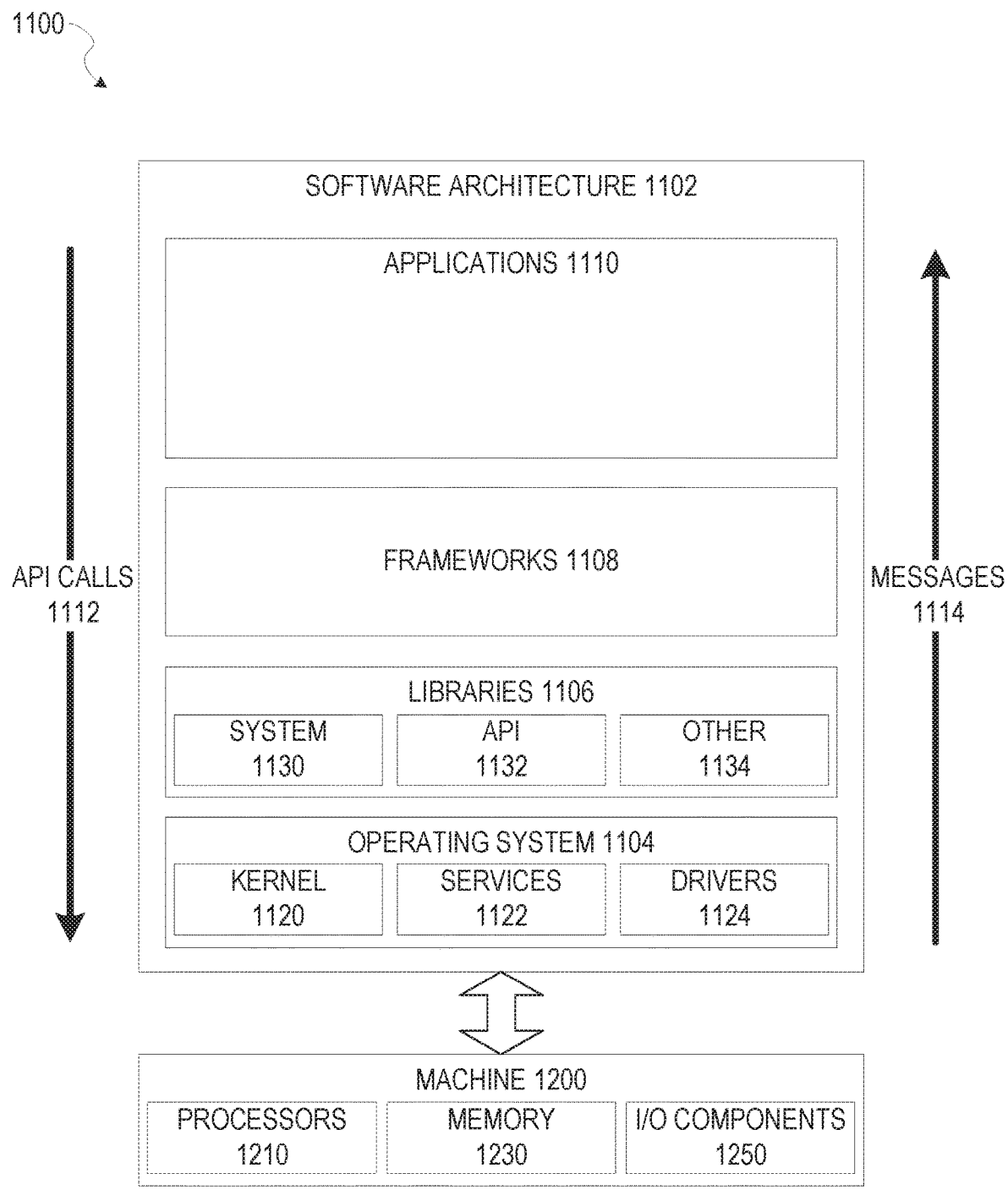
FIG. 11 is a block diagram illustrating an example of a software architecture that may be operating on an EDA computer and used with EDA methods of automatic gate-level FS analysis and FMEDA during design and creation of circuits and circuit designs, in accordance with some embodiments.

FIG. 11 is a block diagram 1100 illustrating an example of a software architecture 1102 that may be operating on an EDA computer and used with methods for integration of FS data into the process flow for FS-aware design and verification of a semiconductor device. The software architecture 1102 can be used as an EDA computing device to implement any of the methods described above. Aspects of the software architecture 1102 may, in various embodiments, be used to store circuit designs and FS data, as well as execute operations for design checks, verification, synthesis, placement and routing, physical sign-off, or any other such operations in an EDA environment to generate circuit designs, with physical devices generated using these circuit designs.

FIG. 11 is merely a non-limiting example of a software architecture 1102, and it will be appreciated that many other architectures can be implemented to facilitate the functionality described herein. In various embodiments, the software architecture 1102 is implemented by hardware such as a machine 1200 that includes multi-core processors 1210, memory 1230, and I/O components 1250. In this example, the software architecture 1102 can be conceptualized as a stack of layers where each layer may provide a particular functionality. For example, the software architecture 1102 includes layers such as an operating system 1104, libraries 1106, software frameworks 1108, and applications 1110. Operationally, the applications 1110 invoke application programming interface API calls 1112 through the software stack and receive messages 1114 in response to the API calls 1112, consistent with some embodiments. In various embodiments, any client device, server computer of a server system, or other device described herein may operate using elements of the software architecture 1102. An EDA computing device described herein may additionally be implemented using aspects of the software architecture 1102, with the software architecture 1102 adapted for operating to perform EDA operations with FS data in accordance with embodiments described herein.

In one embodiment, an EDA application of the applications 1110 performs operations in a FS-aware design and verification process flow, according to embodiments described herein, using various modules within the software architecture 1102. For example, in one embodiment, an EDA computing device similar to the machine 1200 includes the memory 1230, and one or more multi-core processors 1210 are used to implement a process flow similar to process flow 300.

In some embodiments, an output module may be used to update a display of the I/O components 1250 of the EDA computing device with data associated with the updated circuit design and FS data as part of operations of the process flow implemented as modules of applications 1110. In various other embodiments, rather than being implemented as modules of one or more applications 1110, some or all of the EDA modules implementing embodiments described herein may be using elements of the libraries 1106 or the operating system 1104.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 such as libraries of multi-instance blocks for use in an EDA environment or other libraries that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 may also include other libraries 1134.

The software frameworks 1108 provide a high-level common infrastructure that can be utilized by the applications 1110, according to some embodiments. For example, the software frameworks 1108 provide various graphic user interface (GUI) functions, high-level resource management, high-level location services, and so forth. The software frameworks 1108 can provide a broad spectrum of other APIs that can be utilized by the applications 1110, some of which may be specific to a particular operating system 1104 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and viewDefinition files are examples that may operate within a software architecture 1102, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules.

Moreover, the one or more processors may also operate to support performance of the relevant operations in a "cloud computing" environment or as a "software as a service" (SaaS). For example, at least some of the operations may be performed by a group of computers (as examples of machines 1200 including multi-core processors 1210), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1200, but deployed across a number of machines 1200. In some example embodiments, the multi-core processors 1210 or processor-implemented modules are located in a single geographic location (e.g., within a home environment, an office environment, or a server farm). In other example embodiments, the multi-core processors 1210 or processor-implemented modules are distributed across a number of geographic locations.

Figure 12:
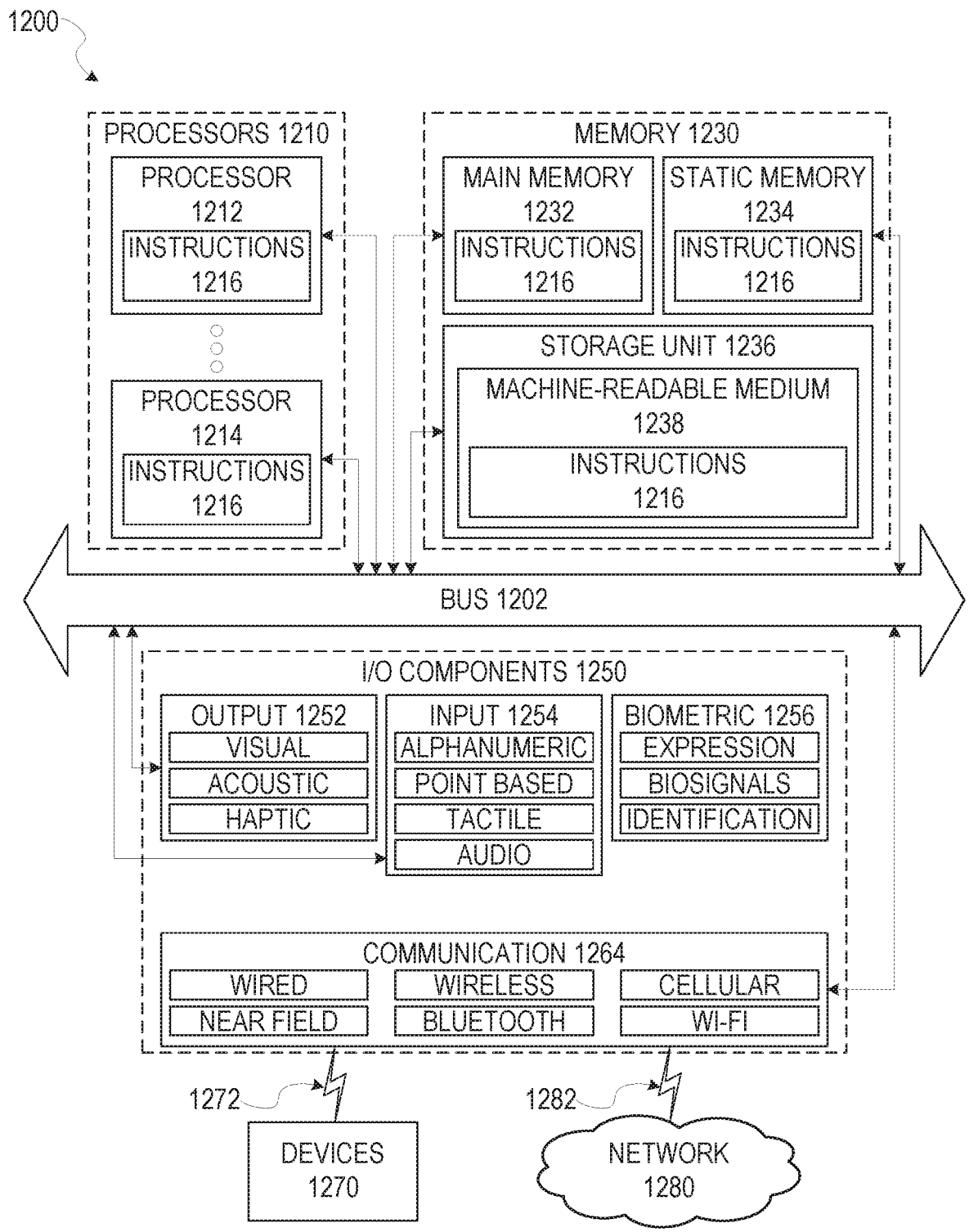
FIG. 12 is a diagrammatic representation of a machine in the form of a computer system within which a set of instructions are executed, causing the machine to perform any one or more of the methodologies discussed herein, according to some example embodiments.

FIG. 12 is a diagrammatic representation of the machine 1200 in the form of a computer system within which a set of instructions may be executed for causing the machine 1200 to perform any one or more of the methodologies discussed herein, according to an example embodiment. FIG. 12 shows components of the machine 1200, which is, according to some embodiments, able to read instructions from a machine-readable medium (e.g., a machine-readable storage medium) and perform any one or more of the methodologies discussed herein. In some embodiments, the machine 1200 may operate with instructions 1216 (e.g., software, a program, an application, an applet, an app, or other executable code) for causing the machine 1200 to perform any one or more of the methodologies discussed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises multi-core processors 1210, memory 1230, and I/O components 1250, which can be configured to communicate with each other via a bus 1202. In an example embodiment, the multi-core processors 1210 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, an independent processor 1212 and an independent processor 1214 that may execute the instructions 1216. The term "processor" is intended to include multi-core processors 1210 that may comprise two or more independent processors 1212, 1214 (also referred to as "cores") that can execute the instructions 1216 contemporaneously. Although FIG. 12 shows multiple multi-core processors 1210, the machine 1200 may include a single independent processor 1212 with a single core, a single processor 1212 with multiple cores (e.g., a multi-core processor 1212), multiple processors 1210 with a single core, multiple processors 1210 with multiples cores, or any combination thereof.

The memory 1230 comprises a main memory 1232, a static memory 1234, and a storage unit 1236 accessible to the multi-core processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the multi-core processors 1210 (e.g., within the processor's cache memory), or any suitable combination thereof, during execution thereof by the machine 1200. Accordingly, in various embodiments, the main memory 1232, the static memory 1234, and the multi-core processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., the instructions 1216) for execution by a machine (e.g., the machine 1200), such that the instructions, when executed by one or more processors of the machine (e.g., the multi-core processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252, input components 1254, and biometric components 1256. The output components 1252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 110, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a USB).

Transmission Medium

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data transfer technology.

Furthermore, the machine-readable medium 1238 is non-transitory (in other words, not having any transitory signals) in that it does not embody a propagating signal. However, labeling the machine-readable medium 1238 "non-transitory" should not be construed to mean that the machine-readable medium 1238 is incapable of movement; the machine-readable medium 1238 should be considered as being transportable from one physical location to another. Additionally, since the machine-readable medium 1238 is tangible, the machine-readable medium 1238 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and the operations may be performed in an order that differs from the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method of electronic design automation (EDA) to generate a circuit design meeting functional safety (FS) design criteria, the method comprising:
   accessing, using one or more hardware processors, register transfer level (RTL) design data for the circuit design stored in memory, the circuit design comprising a plurality of circuit elements;
   accessing, using the one or more hardware processors, a set of FS data associated with an initial circuit design, the set of FS data describing one or more failure modes associated with the plurality of circuit elements, an associated FS design criterion for each failure mode of the one or more failure modes, and one or more of associations between the plurality of circuit elements and the one or more failure modes;
   generating a gate-level netlist using the RTL design data;
   mapping the one or more associations between the plurality of circuit elements from the RTL design data and the one or more failure modes to the gate-level netlist; and
   generating an updated set of FS data using the mapping the one or more associations to the gate-level netlist.

2. The method of claim 1, wherein the set of FS data comprises a Unified Safety Format (USF) file as a single file separate from the RTL design data; and
   wherein the updated set of FS data comprises an updated USF file.

3. The method of claim 2, wherein the USF file comprises:
   safety intent data comprising one or more part or sub-part fields and one or more failure mode fields;
   failure mode design mapping data comprising failure mode distribution fields, instance target fields, and observation point fields; and
   safety design data comprising safety mechanism fields that each identify one or more safety mechanisms.

4. The method of claim 3, wherein the set FS data of the USF file further comprises:
   safety mechanism design mapping data comprising diagnostic coverage fields, safety mechanism instant target fields, and detection port fields; and
   safety metric data comprising fault metric fields.

5. The method of claim 2, wherein the mapping the one or more associations comprises defining a failure mode, effects, and diagnostic analysis (FMEDA) virtual hierarchy within the USF file.

6. The method of claim 5, wherein the mapping the one or more associations further comprises associating elements of the FMEDA virtual hierarchy with design elements of the gate-level netlist.

7. The method of claim 6, wherein the generating the updated set of FS data comprises:
   tracking changes to the design elements of the gate-level netlist; and
   generating the updated USF file using mapping data from the mapping of the one or more associations to determine FS changes associated with the changes to the design elements.

8. The method of claim 7, wherein the tracking the changes to the design elements comprises tracking one or more applied design modifications.

9. The method of claim 8, wherein the one or more applied design modifications comprises:
   a datapath architecture modifications a logic restructuring modification;
   a technology cell mapping;
   a logic pruning modification;
   a retiming modification; and
   an ungrouping modification.

10. The method of claim 8, wherein the one or more applied design modifications are selected from a set of design modifications based on a user selection between options comprising:
    a safety emphasis, a performance emphasis, or a balance between safety and performance.

11. The method of claim 10, further comprising generating one or more FS reports using the updated USF file, the one or more FS reports comprising a dependent failure analysis (DFA) report on failure mode, effects, and diagnostic analysis (FMEDA) data, the DFA report describing DFA countermeasures incorporated in the circuit design.

12. The method of claim 2, further comprising:
    automatically analyzing the gate-level netlist using the updated USF file; and
    generating an updated circuit design based on a FS design failure identified from the updated USF file.

13. The method of claim 2, further comprising:
    automatically adjusting the RTL design data to implement a FS design adjustment when a FS quality check associated with the updated set of FS data fails to meet associated FS design criteria; and
    storing a circuit design file comprising FS-aware placement and routing data.

14. The method of claim 13, wherein the FS design adjustment comprises identifying a safety mechanism associated with safety metric data of the updated set of FS data for the circuit design that does not meet a safety threshold; and
    automatically updating the circuit design using the safety mechanism to improve the safety metric data.

15. The method of claim 14, wherein the automatically updating the circuit design using the safety mechanism to improve the safety metric data comprises one or more of:
    addition of modular redundancy circuitry for a circuit object of the circuit design; and
    addition of parity check circuitry for one or more registers of the circuit design.

16. The method of claim 2, further comprising:
    performing equivalence checking of the RTL design data and the gate-level netlist using the updated set of FS data following synthesis of the gate-level netlist.

17. A non-transitory computer readable storage medium comprising instructions that, when executed by one or more processors of a device, cause the device to perform operations comprising:
    accessing register transfer level (RTL) design data for an initial circuit design stored in memory, the initial circuit design comprising a plurality of circuit elements;

generating safety hierarchy definitions for the initial circuit design;
generating safety hierarchy associations for the plurality of circuit elements of the initial circuit design and the safety hierarchy definitions;
generating a Unified Safety Format (USF) file associated with the RTL design data using the safety hierarchy definitions, the safety hierarchy associations, and a set of functional safety (FS) design criteria for the initial circuit design;
synthesizing a gate-level netlist using the RTL design data and the USF file; and
generating an updated USF file by mapping the safety hierarchy associations for the plurality of circuit elements of the initial circuit design from the RTL design data to the gate-level netlist.

18. The non-transitory computer readable storage medium of claim 17, wherein the instructions further cause the device to perform operations comprising:
analyzing the updated USF file to compute failure mode distributions for the gate-level netlist; and
analyzing the updated USF file to compute safety metrics for the gate-level netlist.

19. An electronic design automation (EDA) device for generating a circuit design meeting functional safety (FS) design criteria, the EDA device comprising:
a memory configured to store:
register transfer level (RTL) design data for the circuit design stored in the memory, the circuit design comprising a plurality of circuit elements; and
a set of functional safety (FS) data associated with an initial circuit design associated with the FS design criteria, the set of FS data describing one or more failure modes associated with the plurality of circuit elements and an associated FS design criterion for each failure mode of the one or more failure modes; and
one or more processors coupled to the memory and configured perform synthesis operations to:
generate a gate-level netlist using the RTL design data; and
map one or more of associations between the plurality of circuit elements from the RTL design data and the one or more failure modes to the gate-level netlist.

20. The device of claim 19, wherein the synthesis operations further comprise two or more of:
a datapath architecture modification;
a logic restructuring modification;
a technology cell mapping;
a logic pruning modification;
a retiming modification; and
an ungrouping modification;
as part of FS synthesis operations for generating the circuit design meeting the FS design criteria; and
wherein the one or more processors are further configured to:
generate an updated set of FS data using the mapping of the one or more associations to the gate-level netlist; and
initiate fabrication of the circuit design meeting the FS design criteria.

* * * * *